United States Patent [19]

Hope

[11] 4,229,941
[45] Oct. 28, 1980

[54] METHOD OF AND SYSTEM FOR GENERATING ENERGY FROM SOLAR AND WIND ENERGY SOURCES

[75] Inventor: Charles S. Hope, New York, N.Y.

[73] Assignee: Solwin Industries, Inc., New York, N.Y.

[21] Appl. No.: 872,094

[22] Filed: Jan. 25, 1978

[51] Int. Cl.² .......................... F03G 7/02; F03D 11/02
[52] U.S. Cl. ........................................ 60/641; 60/698; 60/716; 126/443; 126/435
[58] Field of Search ........................................ 415/2–4, 415/81, 143; 60/641, 398, 698, 716, 718; 290/44, 55; 126/271, 443, 435, 450

[56] References Cited

U.S. PATENT DOCUMENTS

| | | | |
|---|---|---|---|
| 219,896 | 9/1879 | Babbitt | 60/398 |
| 996,334 | 6/1911 | Haskins | 60/641 |
| 1,993,213 | 3/1935 | Gill | 60/641 X |
| 4,010,614 | 3/1977 | Arthur | 60/398 X |
| 4,023,368 | 5/1977 | Kelly | 60/698 |
| 4,031,405 | 6/1977 | Asperger | 290/44 X |
| 4,031,702 | 6/1977 | Burnett | 60/641 X |
| 4,068,474 | 1/1978 | Dimitroff | 60/641 X |
| 4,098,081 | 7/1978 | Woodman | 60/398 |

Primary Examiner—Allen M. Ostrager
Attorney, Agent, or Firm—Kirschstein, Kirschstein, Ottinger & Cobrin

[57] ABSTRACT

Solar and wind energy sources are combined into a unitary system for generating electrical energy. A solar collector collects solar rays, and these rays are focused by a parabolic mirror before being conducted through a fresnel tube to a container which minimizes thermal exchange with the exterior environment. The thermal energy of the rays within the container is converted to mechanical energy by a boiler and a steam-operated turbine. A wind collector converts air currents to mechanical energy which is selectively mechanically coupled to the mechanical energy derived from the solar collector prior to being converted to electrical energy.

14 Claims, 6 Drawing Figures

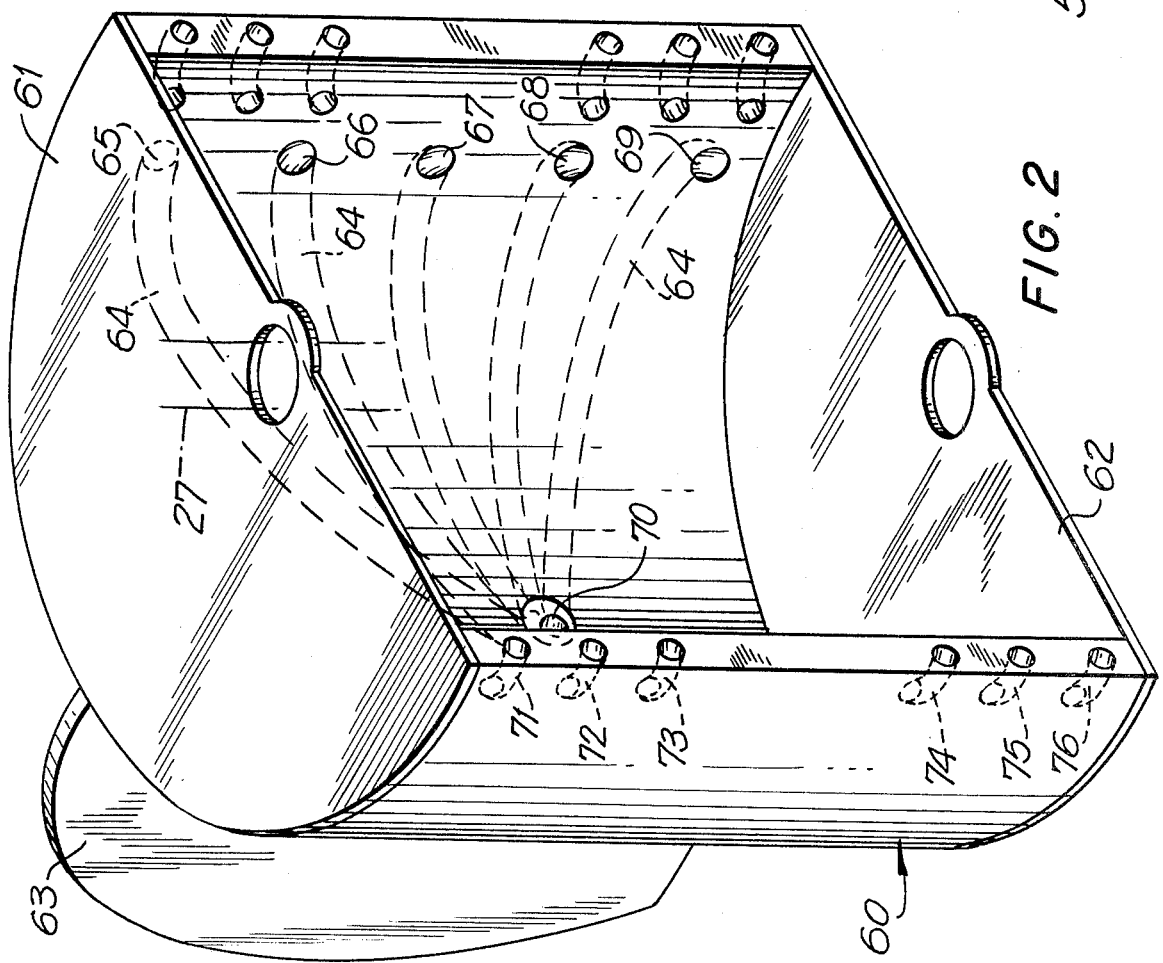

METHOD OF AND SYSTEM FOR GENERATING ENERGY FROM SOLAR AND WIND ENERGY SOURCES

BACKGROUND OF THE INVENTION

1. Field of the Invention

The present invention generally relates to energy generating systems and, more particularly, to such systems which generate electrical energy from solar and wind energy sources. Still more particularly, the present invention relates to a method of generating electrical energy for domestic use from solar and wind energy sources.

2. Description of the Prior Art

Solar energy collectors employing solar radiation absorbing panels are known, and wind energy collectors such as windmills are likewise well known for the purpose of generating energy. Although such collectors are generally satisfactory for their intended purposes, they have not proven to be altogether cost effective in practice. The total cost for building an electrical energy generating system to meet the domestic needs of a household has been prohibitive to date.

SUMMARY OF THE INVENTION

1. Objects of the Invention

Accordingly, it is the general object of the present invention to overcome the above-mentioned drawbacks of the prior art.

It is another object of the present invention to provide a cost effective system for generating energy from both solar and wind energy sources.

It is still another object of the present invention to provide a unitary energy generating system which derives its energy output from dual energy sources.

It is a further object of the present invention to provide a novel method of generating energy from solar and wind energy sources.

In keeping with these objects and others which will become apparent hereinafter, one feature of the invention resides, briefly stated, in a method of and system for generating energy from solar and wind energy sources, which comprise means for collecting solar rays, and for focusing the collected rays along a first path towards a concentration area. A planar mirror is positioned in the first path for diverting the focused rays therefrom. A fresnel tube is placed along a second path for conducting the diverted rays therealong. A container is positioned in the second path for receiving the conducted rays, and is adapted to prevent thermal exchange with the exterior environment. Means are provided for converting the thermal energy contained in the rays conducted to the container to mechanical energy. A wind energy collector collects wind energy and is operative for converting the collected wind energy to mechanical energy. The mechanical energy derived from the solar rays and the mechanical energy derived from the wind energy are both converted to electrical energy by a converter.

In accordance with the invention, the feature of collecting solar rays and focusing such rays is obtained by a parabolic reflecting mirror. This type of mirror is particularly advantageous because the thermal and light energy contained in the solar rays are intensified and concentrated prior to being diverted by the fresnel tube. Another feature of the invention is embodied in providing the inner circumferential surface of the fresnel tube with a silvered coating to thereby minimize energy losses. Furthermore, the container is advantageously provided with a coating of opaque material to thereby keep the thermal and light energy contained in the solar rays admitted to the container substantially within the same.

All of the features described above cooperate with each other to minimize energy losses during each processing stage of the system. This concept of minimizing losses is continued in subsequent stages. For example, the boiler is located directly in the container to facilitate thermal exchange with the rays contained therein.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a perspective view of an air shield as shown in FIG. 1;

FIG. 3 is a front view of an air vane as shown in FIG. 1;

FIG. 4 is a side view of the air vane of FIG. 3;

DESCRIPTION OF THE PREFERRED EMBODIMENTS

Figure 1:
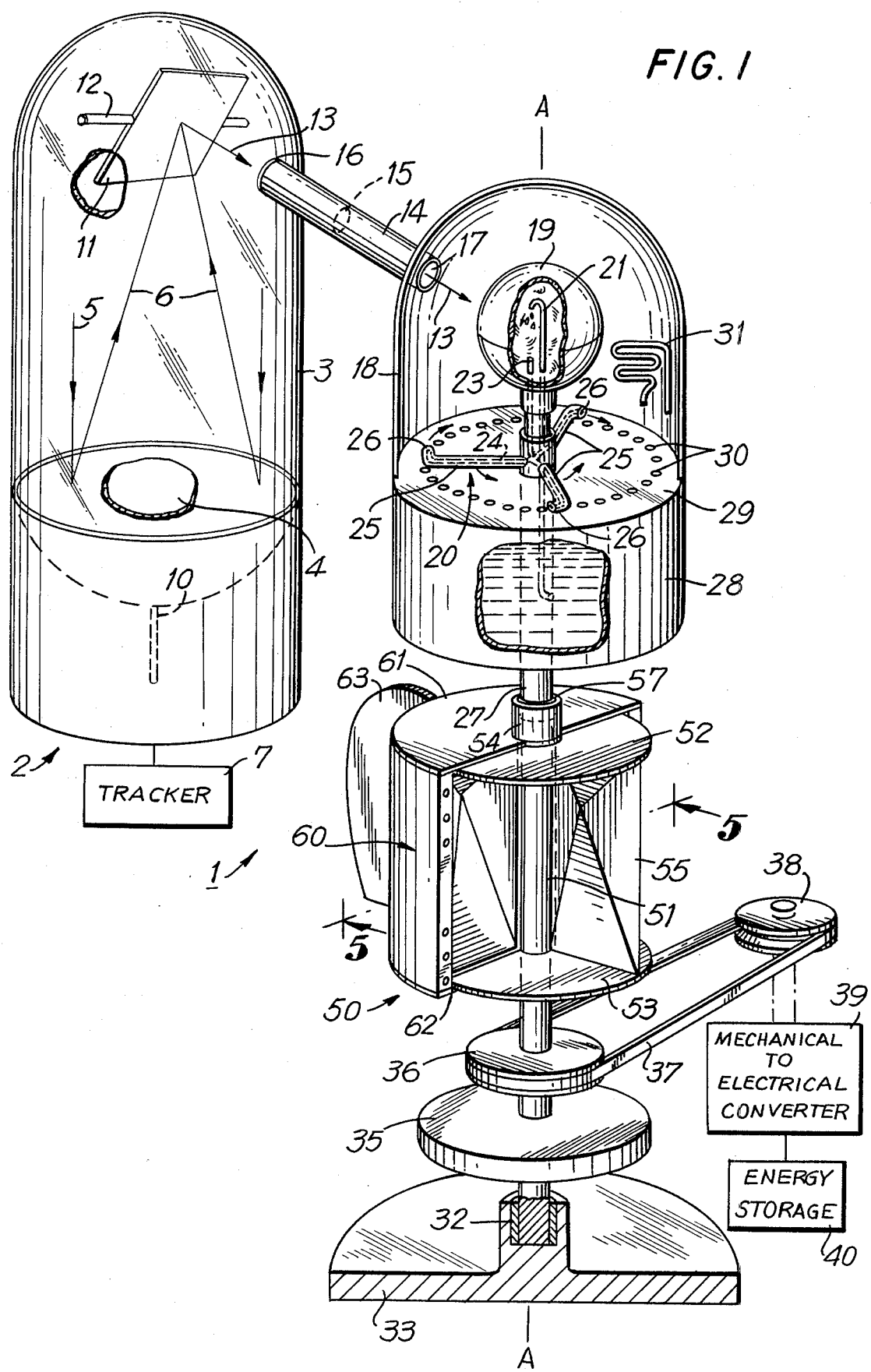
FIG. 1 is a partially sectioned, partially broken-away, perspective view of the system for generating energy from solar and wind energy sources in accordance with the method of the present invention.

Referring now to the drawings, and more particularly to FIG. 1 thereof, reference numeral 1 generally identifies the overall system for generating mechanical and electrical energy from solar and wind energy sources in accordance with the method of the present invention. The system 1 comprises a collector 2 for collecting the rays of the sun. The solar collector 2 includes a dome-shaped housing 3 constituted by light-transmissive, transparent material such as glass or transparent synthetic plastic material. A light-reflective, concave-shaped and preferably parabolic-shaped, mirror 4 is mounted within the housing 3. Solar rays pass through the transparent housing 3 in direction of the arrows 5 and impinge on the parabolic mirror 4, whereupon the reflecting mirror 4 focuses the solar rays along converging paths in direction of the arrows 6 towards the focal point of the parabolic mirror. At this focal point, the light and heat energy contained in the solar rays are concentrated in a small area. In order to properly position the parabolic mirror 4 to track the sun during its trajectory, a conventional tracker unit is operative to cause directional changes for the mirror which is supported on post 10. It is desirable if the mirror 4 can be turned through an angular distance of about 180°.

A light-reflective planar mirror 11 is fixedly positioned adjacent the focal point by a support post 12. Planar mirror 11 is operative for diverting the solar rays from paths 6 towards a different path in direction of arrows 13. The diverted solar rays are conducted through a fresnel tube 14 having a fresnel lens 15 mounted intermediate the opposite end regions of the tube 14. One end region of the tube 14 is fixedly mounted in an aperture 16 formed in the housing 3; and the other end region of the tube 14 is fixedly mounted in an aperture 17 formed in a container 18. The inner circumferential surface of the tube 14 is silvered in order to minimize light and thermal energy losses during conduction of the rays along the tube 14.

The container 18 is dome-shaped and constituted by non-light-transmissive or opaque material such as any metal material, aluminum being preferred. A thermally-insulating coating such as black sputtered aluminum is deposited on the inner surface of the container 18 to thereby prevent thermal exchange with the exterior environment and keep a substantial portion of the thermal energy conducted to the container 18 within the same. The container 18 thus serves as a black body and concentrates thermal energy within it.

In order to convert the thermal energy within the container 18 to mechanical energy, a boiler 19 generates steam for operating a steam turbine 20. Boiler 19 is located within container 18 and is composed of two hemispherically-shaped sections.

Water from reservoir 28 is pumped through water conduit 21 and into the interior of the boiler 19, wherein it is converted to steam by heat exchange with the thermal energy within container 18. The steam is conducted through steam conduit 23 through channels 24 formed within turbine arms 25. Jet nozzles 26 permit the steam to escape and serve to rotate the drive shaft 27 in circumferential direction about axis A—A. The escaped steam falls on a top plate 29 of the reservoir 28. Plate 29 has a plurality of holes 30 arranged in an annulus below the annular path of travel of the nozzles. The steam condenses into water droplets and collects within the reservoir 28, thus forming a closed fluid system.

Copper coils 31 are also located within the container 18. The water which circulates through the coils 31 is heated and circulated to the domestic hot water system for domestic consumption or for providing steam heat. The condensed steam within the reservoir 28 can also be used to supply additional hot water to the coils 31.

The rotary drive shaft 27 is journalled by bearing sleeve 32 in support 33. In order to regulate the speed of rotation of the drive shaft 27, a flywheel 35 is fixedly mounted on drive shaft 27. The flywheel 35 also serves to store rotary energy generated during rotation of the shaft 27.

In order to convert the mechanical energy being generated by the drive shaft 27 to electrical energy, a spool 36 is fixedly mounted on the shaft 27 for rotation therewith. An endless belt 37 is entrained about spool 36 and another spool 38 which is operatively connected to a mechanical-to-electrical converter, such as an electrical generator 39. If desired, the electricity generated by generator 39 is stored in an electrical energy storage device 40, such as a wet cell battery prior to being used by a consumer.

Figure 5:
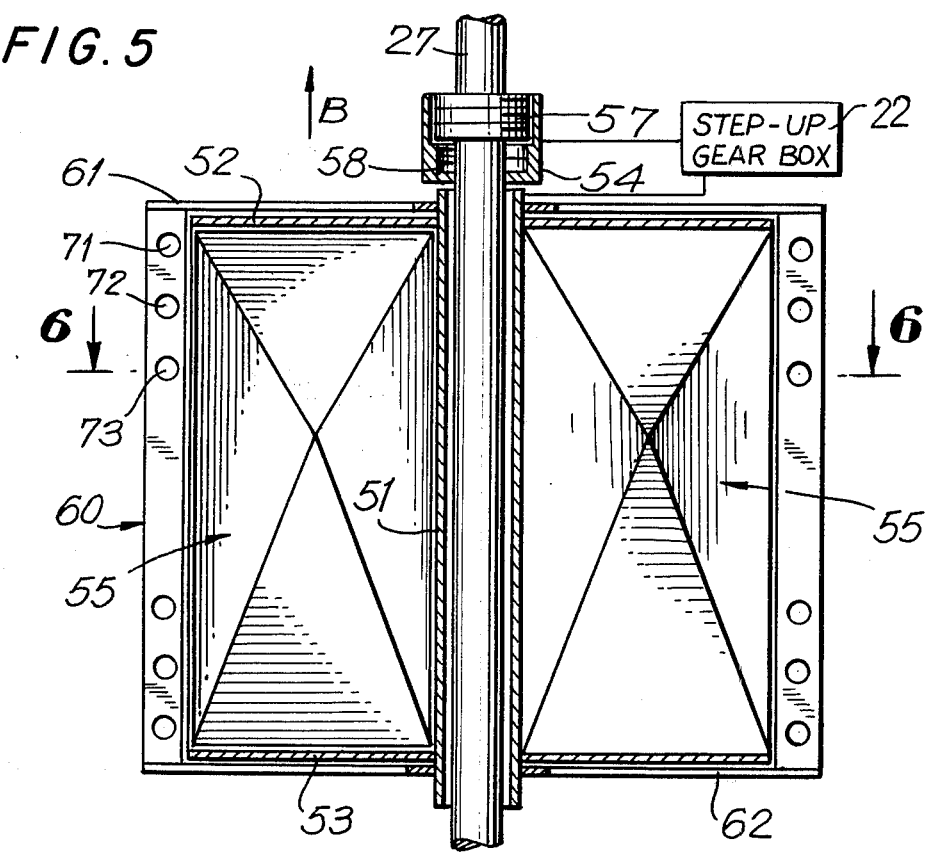
FIG. 5 is a sectional view taken on line 5—5 of FIG. 1.

The system further comprises a wind collector 50 for collecting wind energy. Wind collector 50 includes an auxiliary shaft 51 coaxially surrounding a portion of the drive shaft 27. A pair of axially-spaced plates 52, 53 are fixedly mounted on auxiliary shaft 51. A plurality of air vanes 55 or fins are angularly spaced about axis A—A. As best shown in FIG. 5, the inner edge of each vane is connected to the auxiliary shaft 51; the top edge of each vane is connected to top plate 52; and the bottom edge of each vane is connected to base plate 53. As best shown in FIGS. 3 and 4, each vane 55 has an offset air pocket 56 which is located closer to one axial edge of the vane as compared to the other axial edge of the vane. A cup-shaped member 54 is located above the auxiliary shaft 51, and is formed with a thread 58 of large pitch. The drive shaft 27 is formed with a cooperating thread 57 of large pitch which mates with thread 58. When air currents move against the vanes 55, the auxiliary shaft 51 initially rotates about axis A—A relative to drive shaft 27, and thereupon the entire wind collector 50 is lifted upwardly in axial direction of arrow B due to the asymmetrical location of the air pockets 56. Simultaneously, the cup member 54 is lifted upwardly to thereby cause the threads 57, 58 to mesh with one another. Step-up gear box 22 synchronizes the relatively slower rate of rotation of the auxiliary shaft 51 with the relatively faster drive shaft 27. Eventually, after the completion of a pre-determined number of revolutions, the auxiliary shaft 51 is coupled to the drive shaft 27 for joint rotation therewith. Thus, only when the wind has reached a sufficient force to lift the wind collector upwardly to couple the shaft 51 to the shaft 27, will the shaft 27 be rotated with energy derived not only from a solar source, but also from a wind energy source. When the air currents die down or fall below a pre-determined level, the wind collector 50 will descend due to the force of gravity to thereby decouple the wind collector 50 from the drive shaft 27.

The wind collector 50 also includes an air shield 60 mounted on drive shaft 27 for rotation relative thereto. Air shield 60 has a semi-cylindrical body portion, a top plate 61 and a bottom plate 62. A directional fin or tail 63 is mounted on the shield 60. When air currents move towards the wind collector 50, the tail 63 is moved by and aligned with the wind. The shield 60 thus exposes the vanes 55 directly towards the oncoming wind.

In order to turn the vanes 55 at a faster rate, a plurality of grooves 64 are formed in the shield 60. The grooves 64 have different air inlet apertures 65–69 formed on the inner circumferential surface of the shield, and all these grooves 64 are joined together at a common air outlet aperture 70. Outlet aperture 70 is also formed on the inner circumferential surface of the shield, and is juxtaposed with the region of the air vanes 55 at which the air pockets 56 are located. Thus, air within the shield 60 is collected together from a plurality of spaced-apart locations and ejected directly towards the respective air pockets 56 to increase the mechanical energy output of the wind collector.

Figure 6:
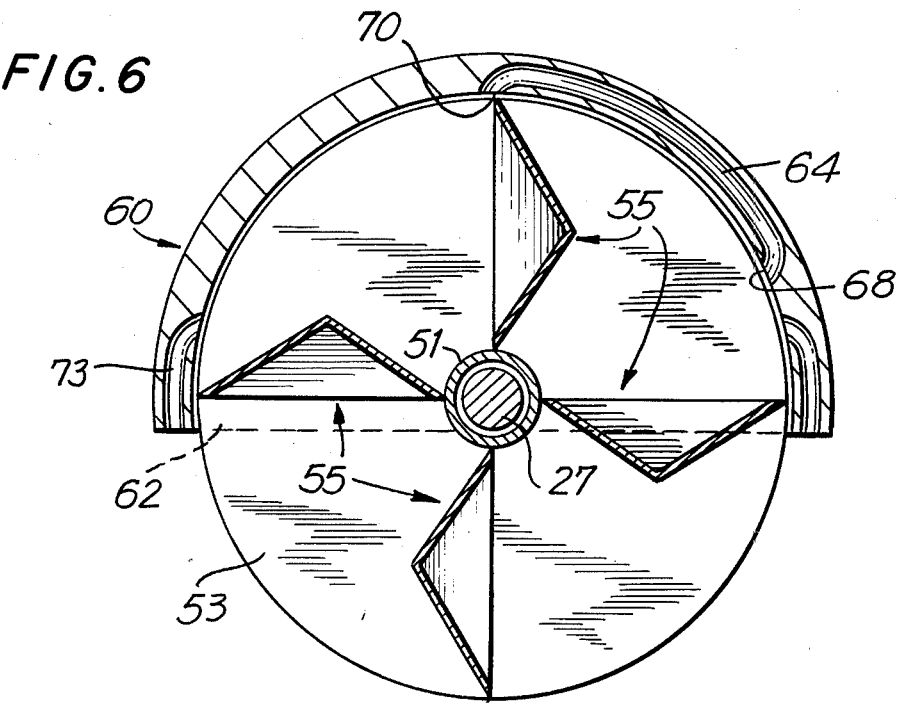
FIG. 6 is a sectional view taken on line 6—6 of FIG. 5.

A plurality of bleed holes 71–76 are also formed on the shield 60. These holes extend from one side of the shield 60 to the other side thereof and permit a portion of the air to enter into the shield 60, as best shown in FIG. 6.

It will be understood that each of the elements described above, or two or more together, may also find a useful application in other types of constructions differing from the types described above.

For example, rather than coupling the mechanical energy derived from solar energy directly with the mechanical energy derived from wind energy together via a mechanical coupling, two mechanical-to-electrical converters can be used to generate electrical currents independently from the solar and wind collectors and thereupon to combine the electrical currents via electrical coupling means.

While the invention has been illustrated and described as embodied in a method of and system for generating energy from solar and wind energy sources, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A system for generating energy from solar and wind energy sources for use in building structures, particularly for domestic use in homes, comprising:
    (a) solar collector means for collecting incident solar rays, and for directing the collected rays along a predetermined path;
    (b) first heat exchanger means including a main fluid circuit along which a vaporizable fluid circulates, said first heat exchanger means being located in the predetermined path for exchanging heat energy with the collected solar rays therein, and for converting the vaporizable fluid in one part of the main circuit to a vaporized gas in another part thereof;
    (c) means for converting the thermal energy contained in the vaporized gas to mechanical energy;
    (d) wind collector means for collecting incident wind energy, and for converting the collected wind energy to mechanical energy;
    (e) means for converting both the mechanical energy derived from the solar rays and the mechanical energy derived from the wind energy to electrical energy, to thereby combine the dual solar and wind energy sources into a unitary power system; and
    (f) second heat exchanger means including a service circuit along which water for domestic use circulates, said second heat exchanger being also located in the predetermined path for exchanging heat energy with the collected solar rays therein, and for heating colder water in one portion of the service circuit to hotter water in another part thereof, to thereby supply heated water for domestic use in the home.

2. The system of claim 1, wherein said solar collector means includes a housing of light-transmissive material, and a light-reflective concave-shaped mirror mounted in said housing.

3. The system of claim 2, wherein said concave-shaped mirror has a generally parabolic configuration having a focal point, and wherein said solar collector means includes mirror mounted in said housing adjacent said focal point.

4. The system of claim 2, wherein said solar collector means includes container means and a fresnel tube having one end region mounted on said housing, and another opposite end region mounted on said container means, said fresnel tube having a silvered inner circumferential surface for minimizing thermal and light energy losses of the collected rays along the predetermined path, and a fresnel lens mounted intermediate said end regions of said tube.

5. The system of claim 4, wherein said container means is composed of non-light-transmissive and thermally-insulating material for concentrating the thermal energy contained in the collected rays.

6. The system of claim 1, wherein said first heat exchanger means includes a boiler having a source of water in heat-exchanging relationship with the heat energy contained in said collected rays to thereby generate steam, and wherein said thermal energy converting means includes a steam-operated turbine having a drive shaft mounted for rotation about its longitudinal axis.

7. The system of claim 6; and further comprising means for regulating the speed of rotation of said drive shaft and for storing the rotary energy generated during such rotation, including a flywheel mounted on said drive shaft for rotation therewith.

8. The system of claim 1; and wherein said thermal energy-converting means includes a rotary drive shaft mounted for rotation about its longitudinal axis; and wherein said wind collector means includes an auxiliary shaft coaxially surrounding said drive shaft, and a plurality of air vanes angularly mounted on said auxiliary shaft for rotating the same.

9. The system of claim 8, wherein each air vane has opposite axial end regions, and an offset air pocket located closer to one axial end region than to the other axial end region.

10. The system of claim 9; and further comprising positioning means for orienting said vanes towards the wind, including an air shield mounted for rotation on said drive shaft, and a directional fin for aligning said shield with the wind.

11. The system of claim 10; and further comprising means on said air shield for permitting air to pass therethrough, including a plurality of bleed holes extending from one side of said shield to the opposite side.

12. The system of claim 10; and further comprising means for guiding the wind within said air shield towards an offset air pocket, including a plurality of grooves formed in said shield, each groove having an air inlet aperture at different locations on said shield and a common outlet aperture in juxtaposed relationship with said offset air pocket.

13. The system of claim 8; wherein said drive shaft has a threaded section; and further comprising means for coupling said auxiliary shaft to said drive shaft for joint rotation therewith upon completion of a pre-determined number of rotations by said auxiliary shaft, said coupling means including a coupling member having a cooperating threaded section which matingly engages with said threaded section of said drive shaft.

14. A method of generating energy from solar and wind energy sources for use in building structures, particularly for domestic use in homes, comprising the steps of:
    (a) collecting incident solar rays, and directing the collected rays along a predetermined path;
    (b) circulating a vaporizable fluid along a main fluid circuit;
    (c) converting the vaporizable fluid in one part of the main circuit to a vaporized gas in another part therof by exchanging heat energy between the vaporizable fluid and the collected rays;
    (d) converting thermal energy contained in the vaporized gas to mechanical energy;
    (e) collecting incident wind energy, and converting the collected wind energy to mechanical energy;

(f) converting both the mechanical energy derived from the solar rays and the mechanical energy derived from the wind energy to electrical energy to thereby combine the dual solar and wind energy sources into a unitary power system;

(g) circulating water for domestic use along a service circuit; and (h) heating colder water in one portion of the service circuit to hotter water in another part thereof by exchanging heat energy between the water and the collected rays, to thereby supply heated water for domestic use in the home.

* * * * *